United States Patent [19]

O'Loughlin et al.

[11] Patent Number: 5,794,973
[45] Date of Patent: Aug. 18, 1998

[54] DUAL STAGE AIR BAG INFLATOR

[75] Inventors: John P. O'Loughlin, Mesa; James R. Hocking, Chandler, both of Ariz.

[73] Assignee: TRW Vehicle Safety Systems Inc., Lyndhurst, Ohio

[21] Appl. No.: 760,392

[22] Filed: Dec. 4, 1996

[51] Int. Cl.$^6$ .................................................. B60R 21/26
[52] U.S. Cl. .................... 280/737; 280/741; 222/3; 102/531
[58] Field of Search ........................... 280/737, 736, 280/741, 742; 222/3; 137/68.13; 102/530, 531

[56] References Cited

U.S. PATENT DOCUMENTS

| | | | |
|---|---|---|---|
| 3,758,131 | 9/1973 | Stephenson et al. | 280/737 |
| 3,961,806 | 6/1976 | Katter | 280/737 |
| 3,985,375 | 10/1976 | Lewis et al. | 280/737 |
| 4,981,534 | 1/1991 | Scheffe | 280/737 |
| 5,058,921 | 10/1991 | Cuevas | 280/741 |
| 5,290,060 | 3/1994 | Smith | 280/737 |
| 5,536,040 | 7/1996 | Cuevas et al. | 280/737 |
| 5,582,428 | 12/1996 | Buchanan et al. | 280/737 |
| 5,615,912 | 4/1997 | O'Loughlin et al. | 280/737 |
| 5,655,790 | 8/1997 | Faigle et al. | 280/737 |
| 5,685,558 | 11/1997 | Cuevas | 280/737 |

*Primary Examiner*—Peter C. English
*Attorney, Agent, or Firm*—Tarolli, Sundheim, Covell, Tummino & Szabo

[57] ABSTRACT

An air bag inflator (20) comprises a container (40) defining a chamber (48) for storing inflation fluid at a first pressure. A rupturable closure or rupture disk (102) extends across an opening (60) in the container (40). Each one of a pair of inflation fluid heating assemblies (122, 124) is located in the chamber (48) and includes an actuatable igniter (222) and an ignitable material (168). The igniter (222) in one inflation fluid heating assembly (122) upon actuation, ignites the ignitable material (168) in the one inflation fluid heating assembly to produce combustion products. The combustion products heat the inflation fluid and increase the pressure of the inflation fluid in the chamber (48) to a second pressure to rupture the rupture disk (102). The igniter (222) in the other inflation fluid heating assembly (124), upon actuation, ignites the ignitable material in the other inflation fluid heating assembly to produce combustion products which further heat and further increase the pressure of the inflation fluid in the chamber (48).

26 Claims, 8 Drawing Sheets

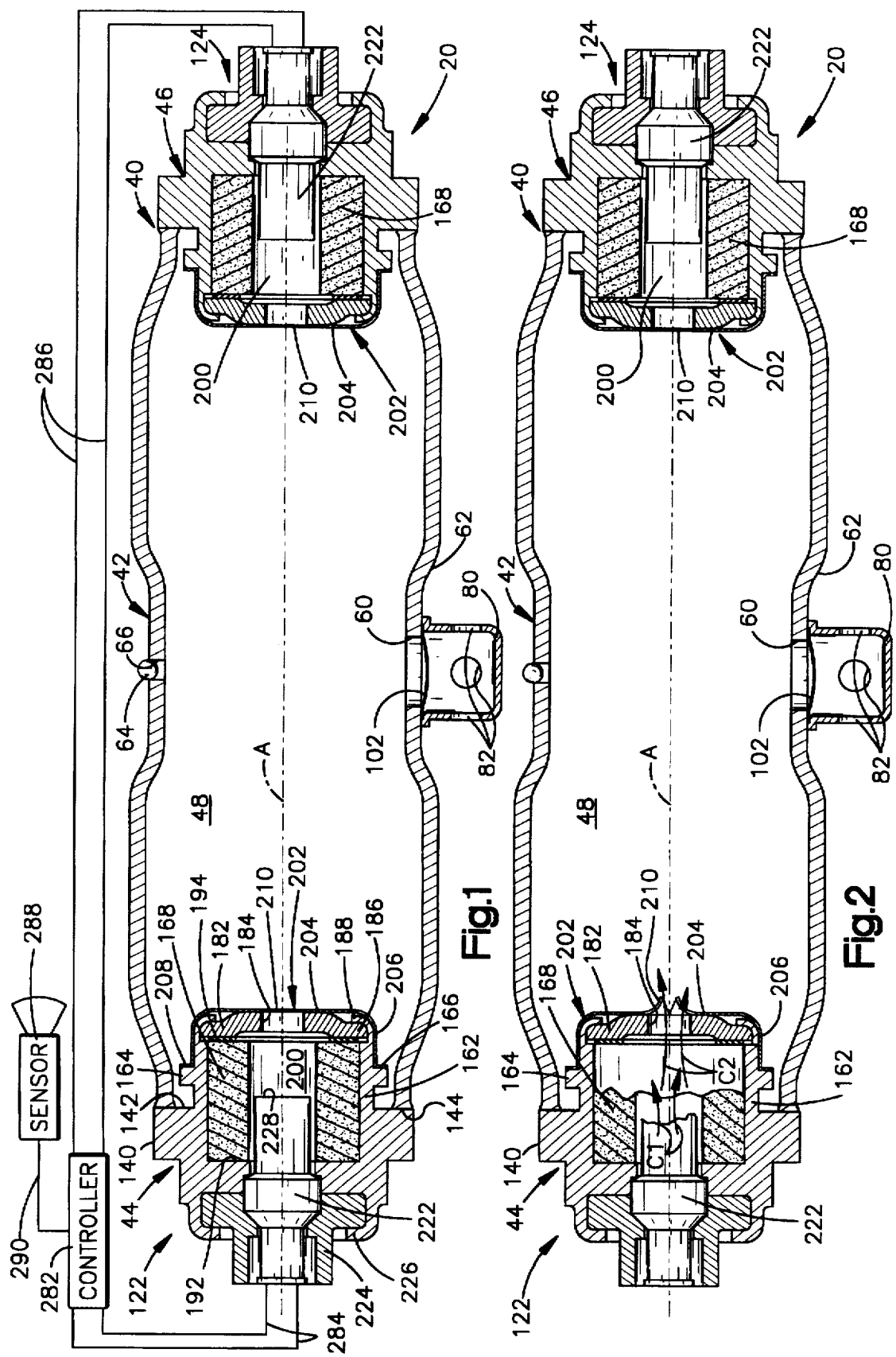

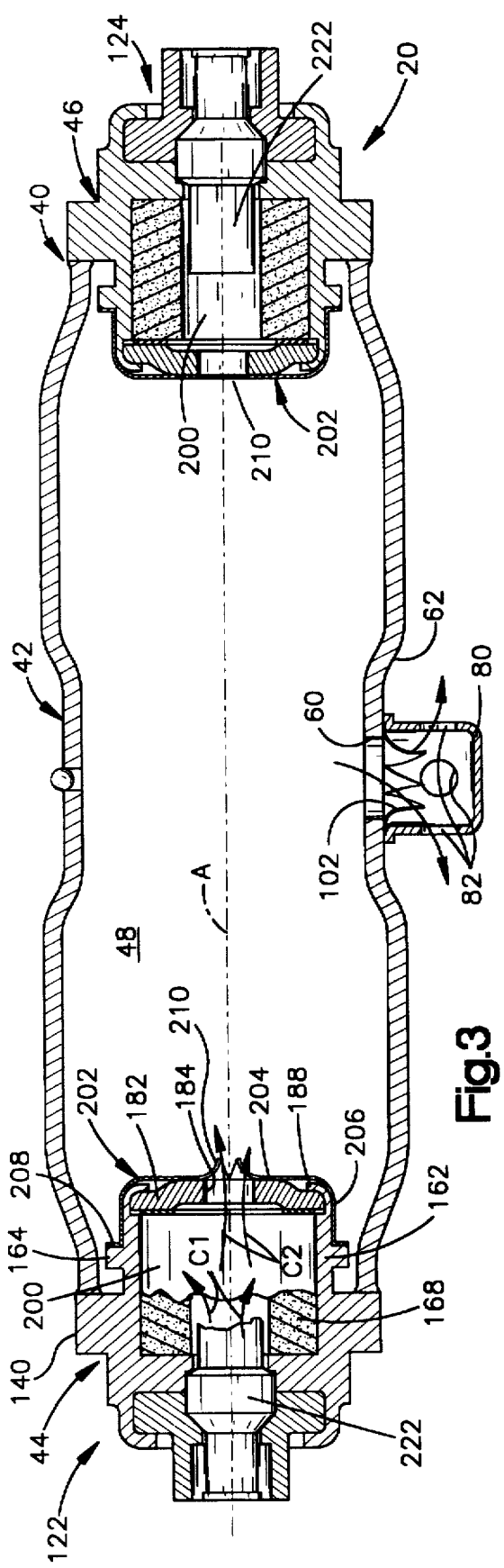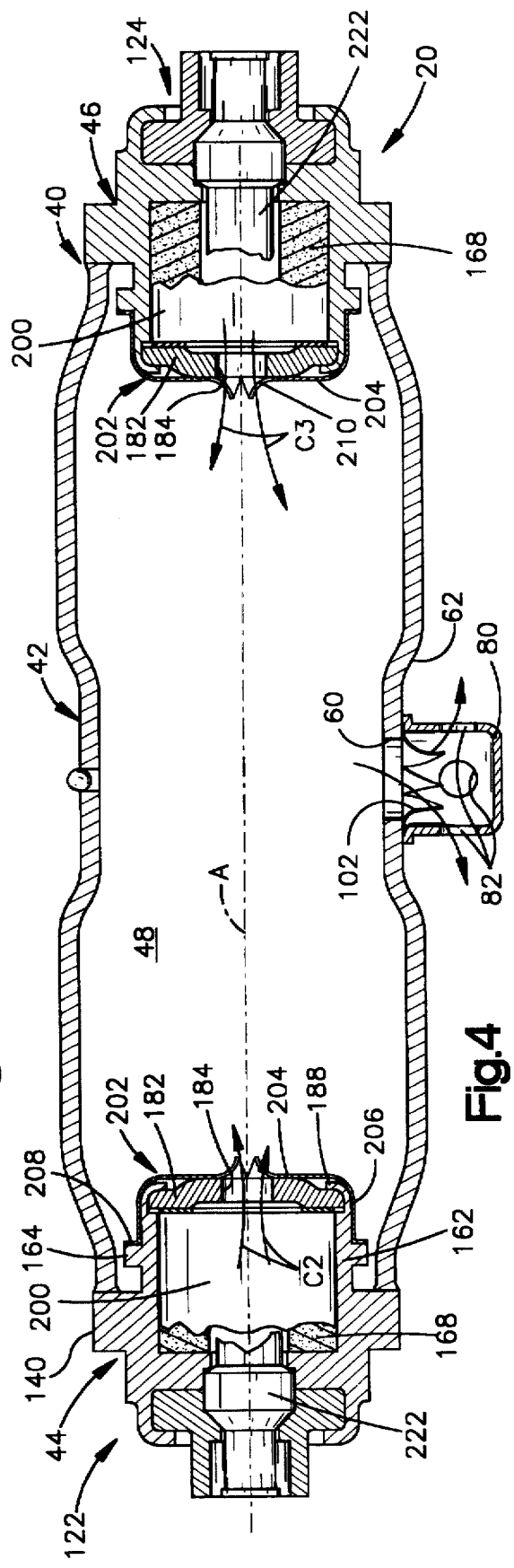

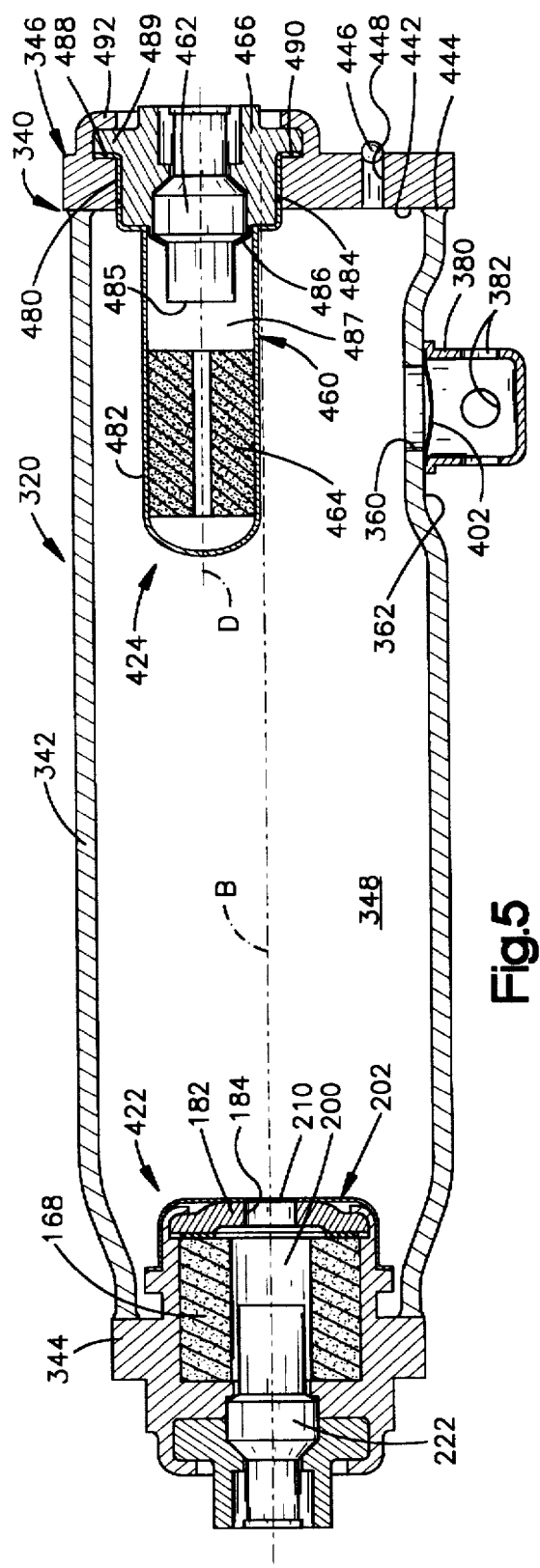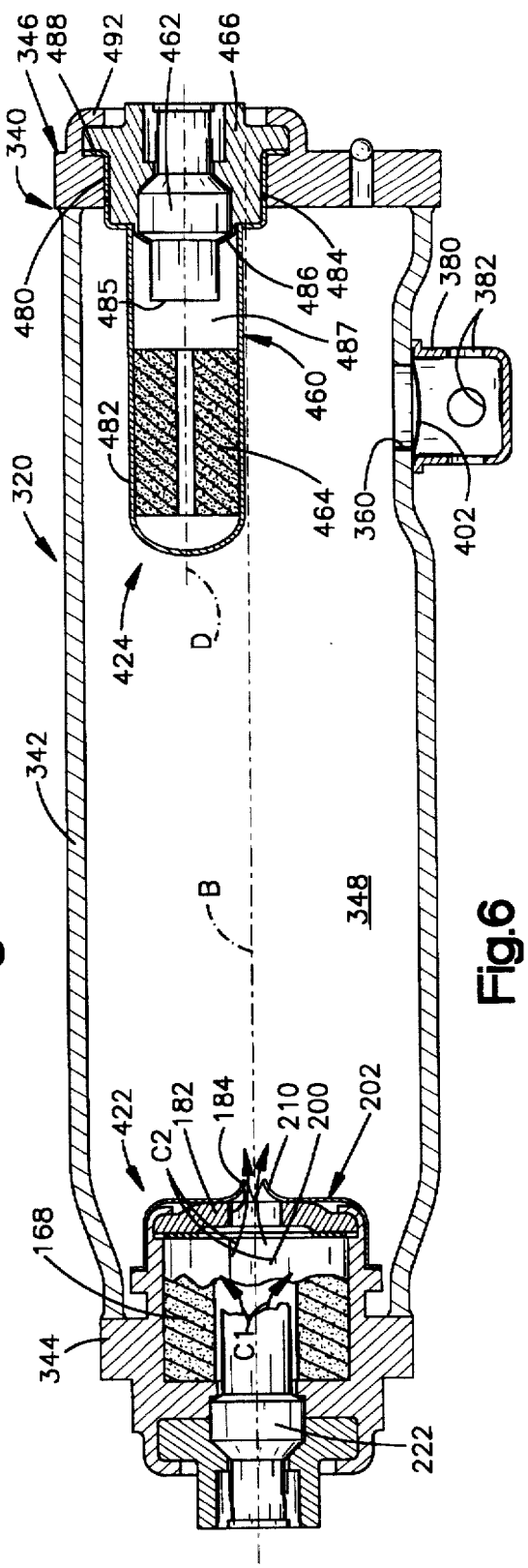

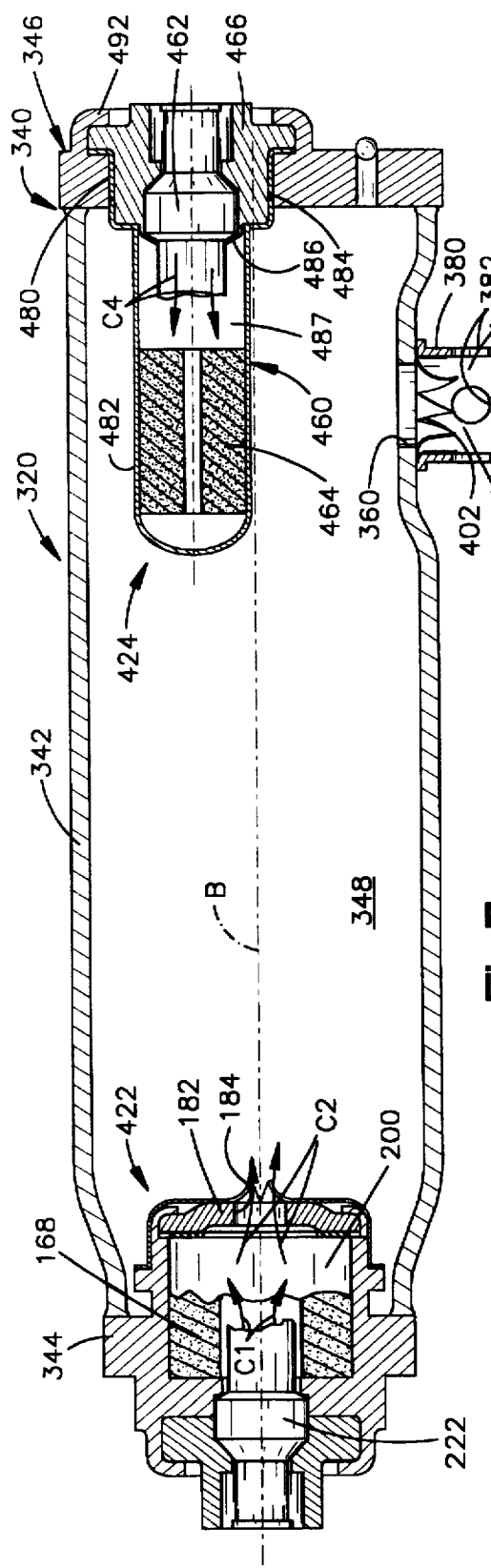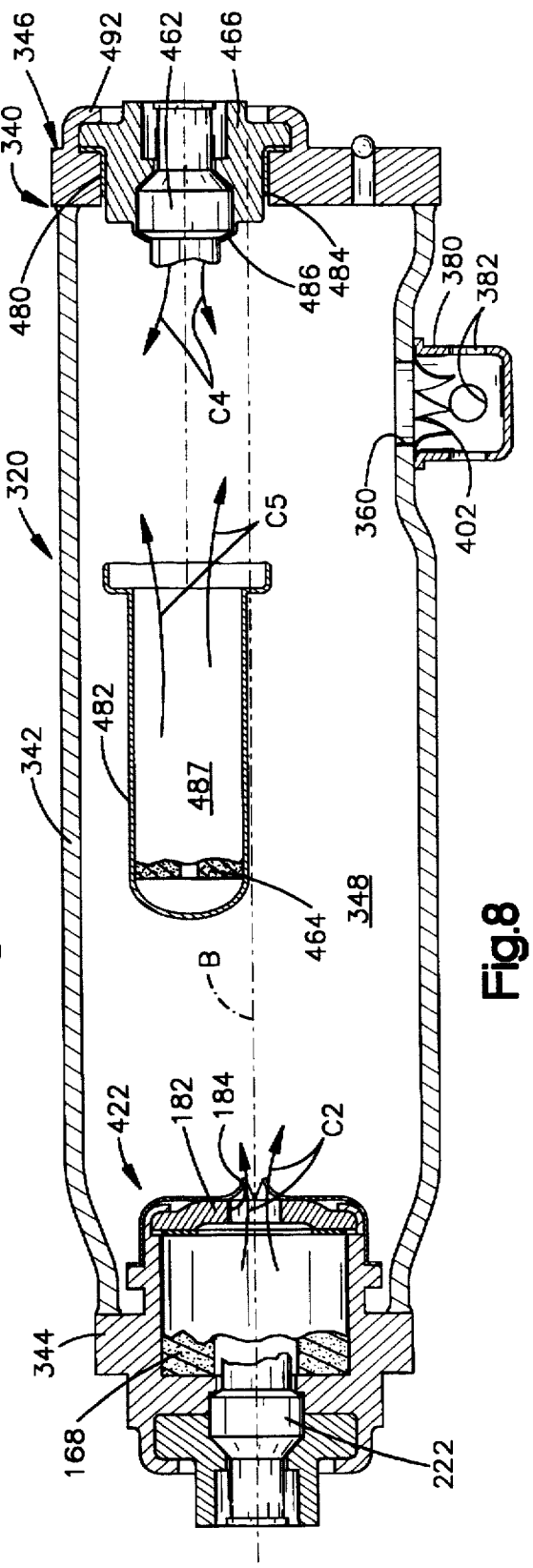
Fig.7
Fig.8

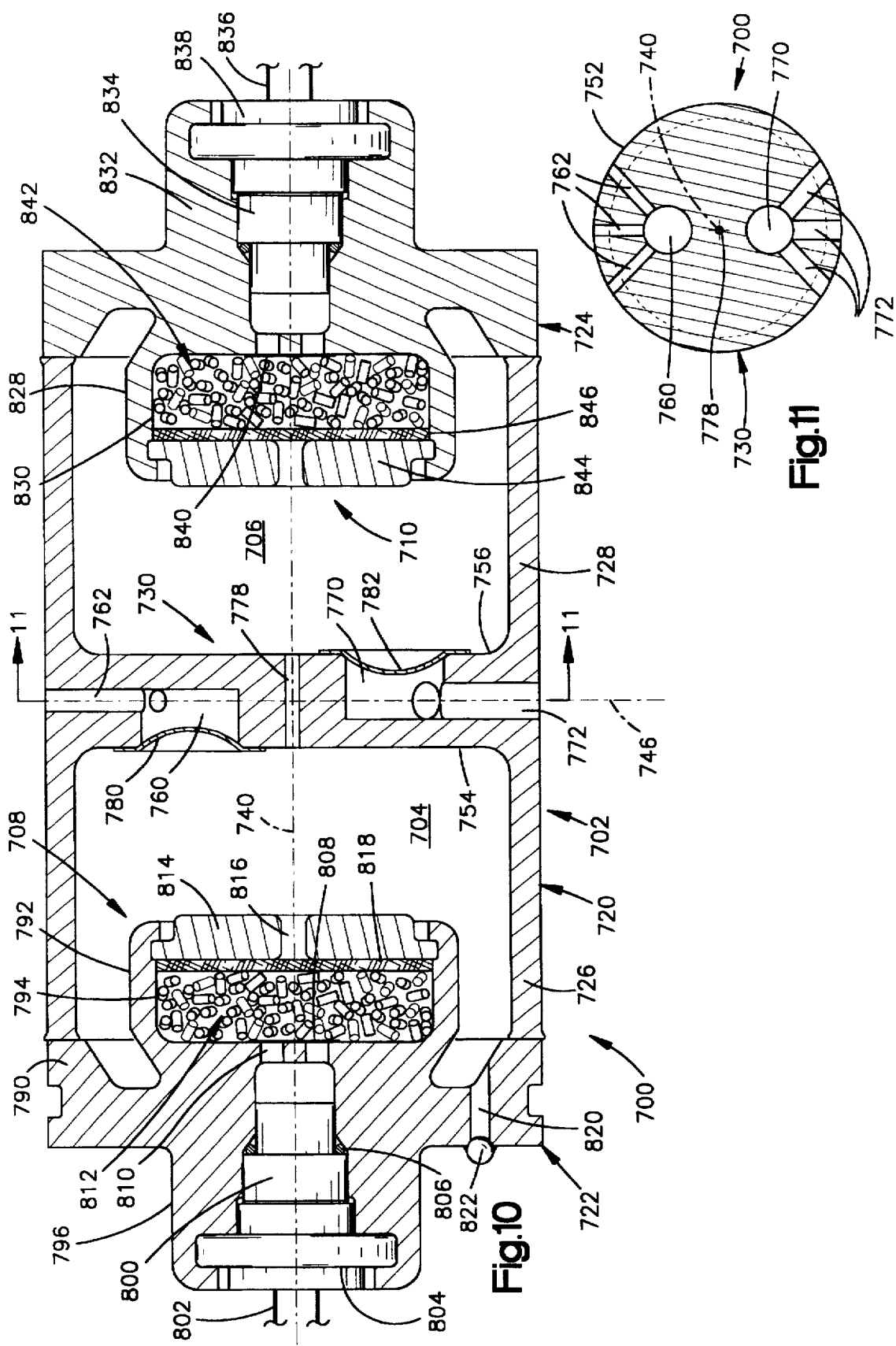

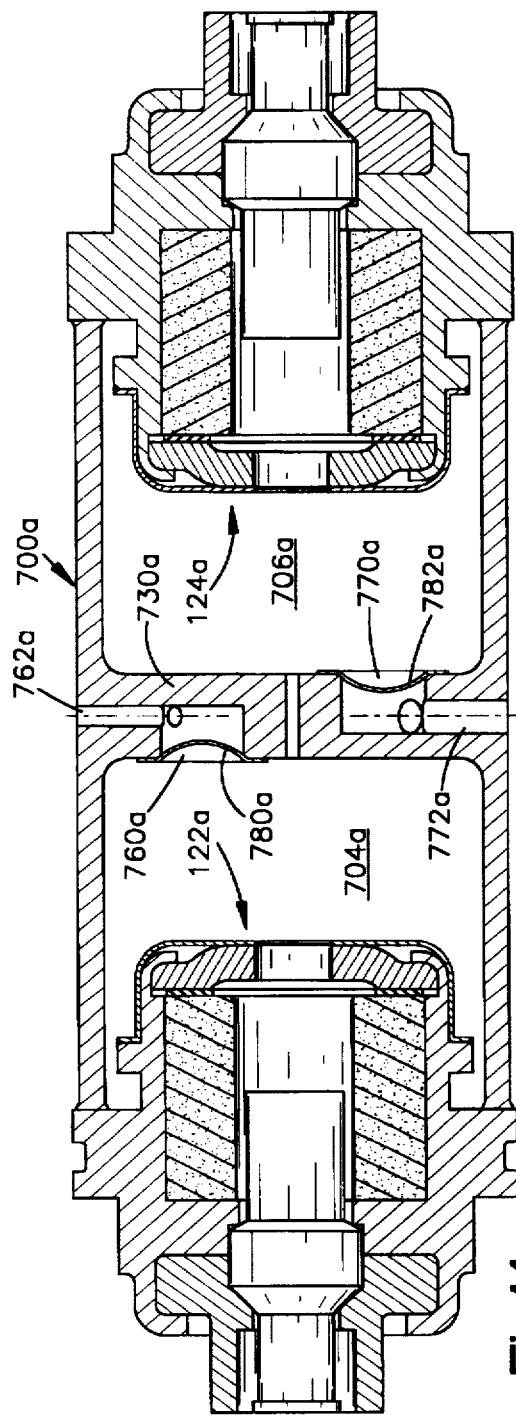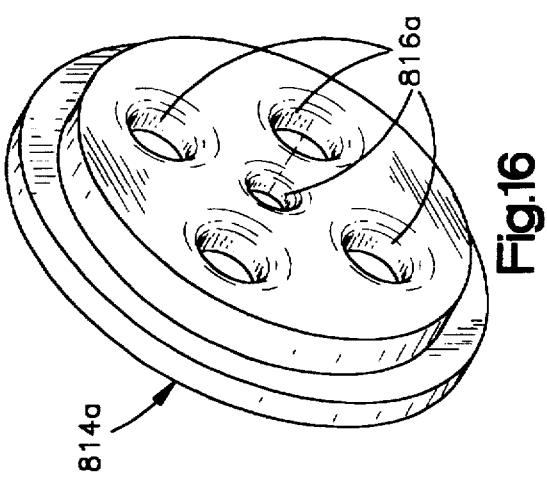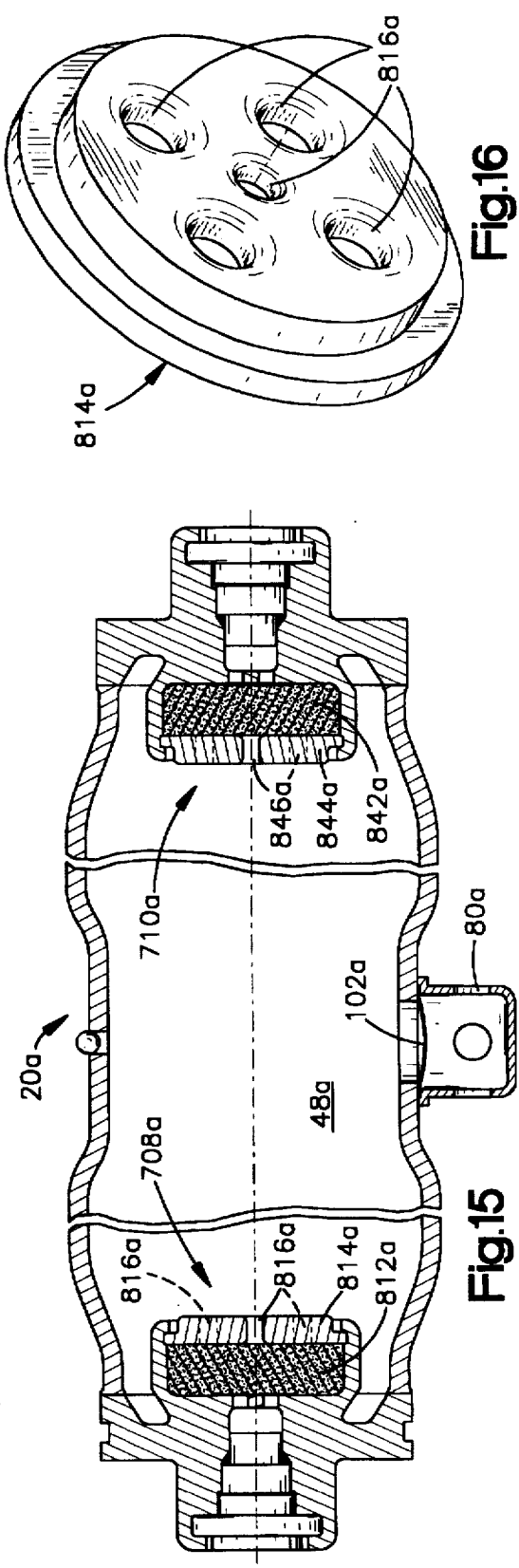

5,794,973

DUAL STAGE AIR BAG INFLATOR

BACKGROUND OF THE INVENTION

1. Technical Field

The present invention relates to an apparatus for inflating an inflatable vehicle occupant restraint, such as an air bag. In particular, the present invention relates to a dual stage air bag inflator.

2. Description of the Prior Art

Inflators for air bags are known. One such known inflator is disclosed in U.S. Pat. No. 5,022,674 and includes a cylindrical housing defining a chamber for storing an inflation fluid under pressure. The housing has an axial end with an opening through which the inflation fluid flows to inflate an air bag. A burst disk initially blocks the flow of the inflation fluid from the chamber through the opening.

In one embodiment, the housing supports a first actuatable igniter outside the chamber adjacent to the burst disk. The housing also supports a pyrotechnic material and a second actuatable igniter, located in the chamber at an end of the container axially opposite the end with the opening. Upon actuation of the first igniter, the burst disk ruptures to allow the inflation fluid to flow through the opening in the housing and into an air bag. Upon actuation of the second igniter, the pyrotechnic material and the second actuatable igniter produce combustion products. The combustion products heat the inflation fluid in the chamber.

SUMMARY OF THE INVENTION

The present invention is directed to an apparatus for inflating an inflatable vehicle occupant restraint, such as an air bag. According to one embodiment of the present invention, the apparatus comprises a container defining a chamber for storing inflation fluid at a first pressure. The container has an opening. A rupturable closure extends across the opening of the container. The closure ruptures in response to pressure in the chamber increasing from the first pressure to a predetermined second pressure. Inflation fluid heating means is located in the chamber. The inflation fluid heating means comprises a pair of assemblies. Each of the pair of assemblies includes an actuatable igniter and an ignitable material adjacent the igniter. The igniter in one assembly ignites, upon actuation, the ignitable material in the one assembly to produce combustion products. The combustion products heat and pressurize the inflation fluid in the chamber to the predetermined second pressure to rupture the closure. The igniter in the other assembly ignites, upon actuation, the ignitable material in the other assembly to produce combustion products which further heat and further pressurize the inflation fluid in the chamber.

The container comprises a tubular housing having a longitudinal central axis and a pair of axially opposite end walls fixed to the housing. The opening is located in the tubular housing substantially at middle of the axial extent of the tubular housing.

The ignitable material of each of the assemblies is tubular and surrounds an end of the corresponding igniter. The igniter in the other assembly is actuated after the igniter in the one assembly is actuated.

Each of the assemblies is preferably in the form of an initiator assembly which includes a rupturable cup fixed to a respective one of the end walls. The cup and the end wall cooperate to define a combustion chamber. The combustion products rupture a portion of the cup. A retainer holds the ignitable material in the combustion chamber. The retainer has an opening through which the combustion products flow from the combustion chamber into the chamber storing the inflation fluid. The opening in the retainer is located on the axis of the tubular housing.

In another embodiment of the present invention, one or both of the assemblies may be provided in the form of an ignition assembly. The ignition assembly comprises a canister having a base section fixed to the end wall and a movable section separable from the base section. An ignitable propellant is located in the movable section of the canister. An actuatable igniter is supported by the end wall and has an end portion located in the canister. The igniter, upon actuation, ignites the propellant in the canister to produce combustion products which separate the movable section of the canister from the base section. The movable section is propelled in the chamber and the burning propellant further heats and pressurizes the inflation fluid in the chamber.

In another embodiment of the invention, the apparatus comprises first and second chambers for storing inflation fluid under pressure. First and second burst discs are associated with the first and second chambers, respectively, for controlling flow of inflation fluid from the first and second chambers into the inflatable device. First and second independently actuatable inflation fluid heating assemblies are associated with the first and second chambers, respectively, for heating inflation fluid in the first and second chambers. A diffuser is located between the first and second chambers. The diffuser has separate first and second passages for directing inflation fluid from the first and second chambers, respectively, into the inflatable device. The first and second burst discs are mounted on the diffuser.

BRIEF DESCRIPTION OF THE DRAWINGS

Further features and advantages of the present invention will become apparent to those skilled in the art to which the present invention relates from reading the following specification with reference to the accompanying drawings, in which:

FIG. 1 is a schematic view of an inflator according to one embodiment of the present invention;

FIGS. 2–4 are views of the inflator similar to FIG. 1 with parts illustrated in different positions;

FIG. 5 is a schematic view of an inflator according to a second embodiment of the present invention;

FIGS. 6–8 are views of the inflator similar to FIG. 5, with parts illustrated in different positions;

FIG. 10 is a schematic view of an inflator according to a fourth embodiment of the present invention, shown in an unactuated condition;

FIG. 11 is a sectional view taken along line 11—11 of FIG. 10;

FIG. 14 is a schematic view of an inflator according to a fifth embodiment of the present invention;

FIG. 15 is a schematic view of an inflator according to a sixth embodiment of the present invention; and FIG. 16 is a perspective view of a part of the inflator of FIG. 15.

DESCRIPTION OF PREFERRED EMBODIMENTS

Figure 9:
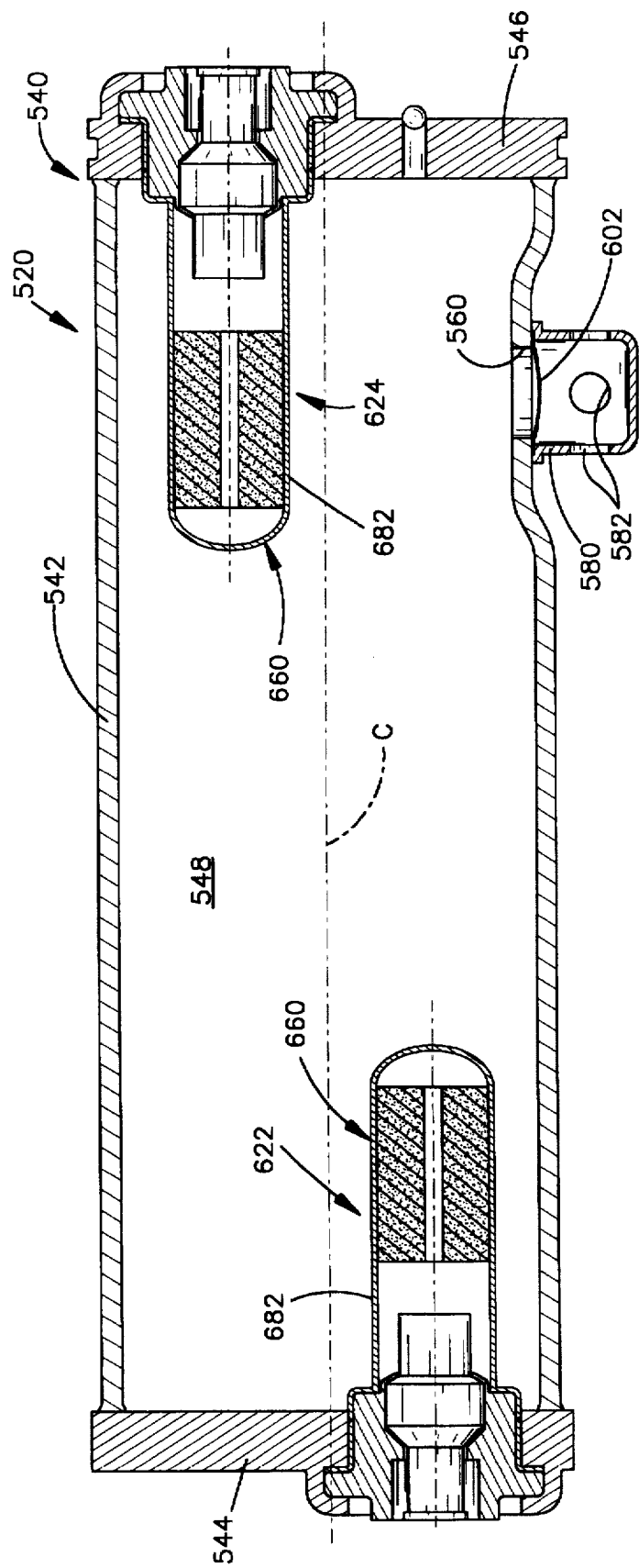
FIG. 9 is a schematic view of an inflator according to a third embodiment of the present invention.

An inflator 20, according to one embodiment of the present invention, is illustrated in FIGS. 1–4 for use in an inflatable vehicle occupant restraint system. The inflator 20 is actuatable to inflate an air bag (not shown), such as a driver side air bag. The inflator 20 is attachable to a steering wheel (not shown) of a vehicle, such as a passenger car, light truck and the like. The air bag is operably connected with the inflator 20.

The inflator 20 includes a cylindrical container 40 having a metal tubular housing 42 with a longitudinal central axis A. The container 40 is preferably attached to the vehicle steering wheel and preferably extends in a transverse direction relative to the axis of a steering wheel shaft. The container 40 also includes a pair of metal end walls 44, 46 which are fixed to axially opposite ends of the tubular housing 42 in a suitable manner, such as by friction welding.

The tubular housing 42 and the end walls 44, 46 define a chamber 48 for storing an inflation fluid for inflating the air bag. The inflation fluid is stored in the chamber 48 of the container 40 at a first pressure which is preferably at least 2,000 psi. The inflation fluid preferably is a known substantially non-ignitable inert gas, such as argon, or a combination of inert gases.

The tubular housing 42 includes an opening 60. The opening 60 is located at approximately the middle of the length of the tubular housing 42, measured in a direction parallel to the axis A, in a recess 62 extending circumferentially about the axis A and the housing. The opening 60 permits the flow of the inflation fluid from the chamber 48 to a location outside of the container 40 to inflate the air bag. A ball closure 64 closes a fill port 66 in the recess 62 at a location circumferentially spaced from the opening 60.

A cup-shaped diffuser 80 is fixed to the tubular housing 42 and surrounds the opening 60. The diffuser 80 includes a plurality of circular openings 82 arranged in a circumferential array. The openings 82 direct the flow of inflation fluid in a radial pattern from the diffuser 80 and towards the air bag. It will be apparent that the openings 82 can be of any suitable shape, size and arrangement in the diffuser 80. The container 40 is preferably attached to the steering wheel so the diffuser 80 is located away from the steering wheel shaft.

A closure or rupture disk 102 is fixed to an exterior surface of the tubular housing 42. The rupture disk 102 initially blocks the flow of inflation fluid from the chamber 48 through the opening 60. The rupture disk 102 is held between the outer surface of the tubular housing 42 and the diffuser 80. The rupture disk 102 is rupturable to allow the flow of inflation fluid from the chamber 48 through the opening 60.

The rupture disk 102 ruptures in response to the pressure of the inflation fluid in the chamber 48 increasing from the first pressure to a predetermined second pressure. The predetermined second pressure is greater than the first pressure, preferably at least 1.5 times the first pressure. The pressure within the chamber 48 may reach the predetermined second pressure by actuating at least one of a pair of actuatable and identically constructed inflation fluid heating assemblies.

The inflation fluid heating assemblies, as illustrated in FIGS. 1–4, are preferably provided in the form of initiator assemblies 122, 124 located in the chamber 48 at axially opposite ends of the container 40. Upon actuation of at least one of the initiator assemblies 122, 124, the inflation fluid is heated from within the container 40. The pressure of the heated inflation fluid in the chamber 48 increases to the predetermined second pressure to rupture the rupture disk 102.

The first initiator assembly 122 is located at the left end of the container 40, as viewed in FIG. 1. The second initiator assembly 124 is located at the right end of the container 40, as viewed in FIG. 1. The first initiator assembly 122 and the second initiator assembly 124 are centered on the axis A of the tubular housing 42. Since the initiator assemblies 122, 124 are structurally and operationally identical, only the first initiator assembly 122 will be described in detail below and the description will serve equally to describe the second initiator assembly 124.

The left end wall 44 has a mounting portion 140 with an annular surface 142 facing axially to the right, as viewed in FIG. 1. A left terminal end surface 144 of the tubular housing 42 engages the annular surface 142 of the mounting portion 140 and is welded to the annular surface by a friction welding or by laser beam welding. The left end wall 44 has a tubular portion 162 which extends to the right from the mounting portion 140, as viewed in FIG. 1, and coaxially along the axis A of the tubular housing 42 of the container 40. The tubular portion 162 of the end wall 44 has an annular mounting flange 164 with a radially extending surface 166 facing in the same direction as the annular surface 142 of the mounting portion 140.

The initiator assembly 122 includes an ignitable material 168, such as potassium perchlorate, located in the tubular portion 162 of the end wall 44. The ignitable material 168 has a tubular shape and, upon ignition, produces combustion products C2 (FIG. 2) including heat. The initiator assembly 122 includes a metal retainer 182 which holds the ignitable material 168 in position.

The retainer 182 has a central opening 184 which is smaller than the opening 60 in the tubular housing 42. The opening 184 of the retainer 182 is located on the axis A of the tubular housing 42. The retainer 182 has a radial outer periphery 186 (FIG. 1) which is held in the end wall 44 by an axial end 188 of the tubular portion 162. The axial end 188 of the tubular portion 162 is deformed over the outer periphery 186 of the retainer 182 to clamp the retainer in the tubular portion.

An end of the ignitable material 168 engages a radially extending surface 192 of the end wall 44. An elastomeric cushion 194 is provided between the retainer 182 and the ignitable material 168. The cushion 194 is compressed when the axial end 188 of the tubular portion 162 is deformed over the outer periphery 186 of the retainer 182 during assembly of the initiator assembly 122.

The initiator assembly 122 includes a thin metal cup 202 which is received over the end 188 of the tubular portion 162 to close and isolate the ignitable material 168 from the inflation fluid in the chamber 48. The cup 202 and the tubular portion 162 of the end wall 44 cooperate to define a combustion chamber 200. The cup 202 includes a base portion 204 which extends in a direction normal to the axis A of the tubular housing 42 and over the opening 184 in the retainer 182. A tubular side portion 206 of the cup 202 extends from the base portion 204 and over the tubular portion 162 of the end wall 44. The cup 202 has a radial extending flange portion 208 which is fixed to the radially extending surface 166 of the mounting flange 164 by a laser weld.

A central area 210 of the base portion 204 of the cup 202 is coined with a cruciform pattern to rupture easily. The central area 210 ruptures when the pressure in the combustion chamber 200 increases to a predetermined third pressure which is greater than the first pressure by a predetermined pressure difference. The rupturing of the central area 210 of the cup 202 allows the combustion products C2 produced by ignition of the ignitable material 168 to flow into the chamber 48.

The initiator assembly 122 includes an actuatable igniter 222 that is supported by the end wall 44. The igniter 222 extends at least partially into the combustion chamber 200. The igniter 222 is located coaxially on the axis A of the tubular housing 42 of the container 40. The igniter 222 is held against a shoulder in the end wall 44 by a mounting member 224. The mounting member 224 is held against the end wall 44 by a left end portion 226 of the end wall being deformed over an annular periphery of the mounting member 224.

The igniter 222 has an end surface 228 which is surrounded by the tubular ignitable material 168. The end surface 228 of the igniter 222 is substantially at mid-length of the ignitable material 168, measured in a direction parallel to the axis A. It will be apparent, however, that the end surface 228 of the igniter 222 may be located axially anywhere along the length of the ignitable material 168 or outside the length of the ignitable material.

Upon actuation, the igniter 222 produces combustion products C1 which contact and ignite the ignitable material 168 in the combustion chamber 200, as illustrated in FIG. 2. The ignitable material 168 upon ignition, produces the combustion products C2, in the combustion chamber 200. When the pressure in combustion chamber 200 reaches the predetermined third pressure, the central area 210 in the base portion 204 of the cup 202 ruptures. The combustion products C2 are directed through the opening 184 in the retainer 182 and into the inflation fluid in the chamber 48.

The combustion products C2 heat the inflation fluid in the chamber 48. Heating the inflation fluid causes the pressure in the chamber 48 to increase to the predetermined second pressure and rupture the rupture disk 102, as illustrated in FIG. 3. After the rupture disk 102 is ruptured, the inflation fluid is free to flow from the chamber 48 through the opening 60 in the housing 42, into the diffuser 80, through the diffuser openings 82 and into the air bag.

The second initiator assembly 124, upon actuation of the igniter 222 in the second initiator assembly, ignites the ignitable material 168 in the second initiator assembly to produce combustion products C3, as illustrated in FIG. 4. The combustion products C3 rupture the central area 210 of the second initiator assembly 124 and are released into the chamber 48 through the opening 184 in the retainer 182. The combustion products C3 further heat and pressurize the inflation fluid remaining in the chamber 48. The further heating and pressurizing of the inflation fluid in the chamber 48 helps expel the remaining inflation fluid from the chamber to inflate the air bag further. The second initiator assembly 124 can be controlled to actuate after actuation of the first initiator assembly 122 and tailor the inflation of the air bag by controlling the inflation fluid pressure in the air bag as a function of time.

The first initiator assembly 122 is electrically connected to a controller 282 (FIG. 1) by wires 284. The second initiator assembly 124 is also electrically connected to the controller 282 by wires 286. The controller 282 is electrically connected to at least one sensor 288 over a wire 290. The controller 282 is also electrically connected to a collision sensor (not shown). When the collision sensor communicates a signal to the controller 282 indicating that a collision requiring inflation of the air bag has started, the controller triggers actuation of the first and second initiator assemblies 122, 124.

The controller 282 uses a signal from the sensor 288 and a signal from the collision sensor to determine if and how much of a time delay is to occur between actuation of the first initiator assembly 122 and actuation of the second initiator assembly 124. The signal from the sensor 288 is indicative of at least one factor present during a collision of the vehicle. The time delay enables the inflator 20 to provide a desired pressure of the inflation fluid in the air bag as a function of time. The pressure which is delivered to the air bag as a function of time is dependent upon at least one of various factors, such as occupant weight, distance from the air bag, position or orientation on a vehicle seat, vehicle speed, severity of the crash, temperature within the passenger compartment and the like. Any or all of these factors can be used by the controller 282 to calculate the time delay for actuating the second initiator assembly 124 after actuation of the first initiator assembly 122.

In operation, the first initiator assembly 122 is actuated to effect rupturing of the rupture disk 102 by increasing the pressure of the inflation fluid in the chamber 48 to the predetermined second pressure. When the rupture disk 102 ruptures, inflation fluid flows from the chamber 48 through the opening 60 to inflate the air bag. Simultaneously with, or slightly after actuation of the first initiator assembly 122, the second initiator assembly 124 is actuated. The second initiator assembly 124 further heats and pressurizes the remaining inflation fluid in the chamber 48 to expel the inflation fluid from the chamber and further inflate the air bag.

An air bag inflator 320 (FIGS. 5–8), according to another embodiment of the present invention, is similar in structure and operation to the inflator 20, illustrated in FIGS. 1–4 and described above. The inflator 320 includes a cylindrical container 340 which has a metal tubular housing 342 with a longitudinal central axis B. The container 340 also includes a pair of metal end walls 344, 346 which are fixed to axially opposite ends of the tubular housing 342. The tubular housing 342 and the end walls 344, 346 define a chamber 348 for storing an inflation fluid at a first pressure.

The tubular housing 342 includes an opening 360. The opening 360 is located in a right end portion of the tubular housing 342, as viewed in FIGS. 5–8, in a recess 362. The opening 360 permits the inflation fluid to flow from the chamber 348 to a location outside of the container 340 for inflating an air bag.

A cup-shaped diffuser 380 is fixed to the tubular housing 342 and surrounds the opening 360. The diffuser 380 includes a plurality of circular openings 382. The diffuser 380 directs the flow of inflation fluid from the opening 360 towards the air bag.

A closure or rupture disk 402 is fixed to an exterior surface of the tubular housing 342. The rupture disk 402 is held between the outer surface of the tubular housing 342 and the diffuser 380. The rupture disk 402 initially blocks the flow of inflation fluid from the chamber 348 through the opening 360. The rupture disk 402 is rupturable to allow the flow of inflation fluid from the chamber 348 through the opening 360 to inflate the air bag. The rupture disk 402 ruptures in response to the pressure of the inflation fluid in the chamber 348 increasing to a predetermined second pressure. The predetermined second pressure is greater than the first pressure, preferably at least 1.5 times the first pressure.

The inflator 320 includes a pair of actuatable inflation fluid heating assemblies in the form of an initiator assembly 422 and an ignition assembly 424. The initiator assembly 422 is located in the chamber 348 at the left end of the container 340, as viewed in FIG. 5. The initiator assembly 422 is identical in structure and operation to the initiator assemblies 122, 124 illustrated in FIGS. 1–4 and described above. The initiator assembly 422 is located coaxially on the axis B of the container 340.

The ignition assembly 424 is located at the right end of the container 340, as viewed in FIG. 5. The ignition assembly 424 is structurally different but functionally similar to the initiator assemblies 122, 124. The ignition assembly 424 is fixed to the right end wall 346 of the container 340. The right end wall 346 has an annular mounting surface 442. A right terminal end surface 444 of the tubular housing 342 engages and is friction welded to the annular mounting surface 442 of the right end wall 346. A ball 446 closes a fill port 448 in the right end wall 346.

The ignition assembly 424 includes a tubular canister 460 with a longitudinal axis D, an igniter 462, an ignitable propellant 464 and an annular mounting 466. The canister 460 has a relatively large diameter tubular base 480 supported in the end wall 346 and a smaller diameter movable section 482 connected to the base at a frangible section 484. The tubular base 480 receives a portion of the annular mounting 466. The igniter 462 extends through the central opening in the mounting 466. One end 485 of the igniter 462 is located in a chamber 487 defined by the mounting 466 and the movable section 482 of the canister 460. Also located in the chamber 487 is the propellant 464, which is spaced apart from the end 485 of the igniter 462 in a direction along the axis D.

A left end portion 486 of the mounting 466 is deformed against a shoulder of the igniter 462 to retain the igniter in the mounting. Adjacent its right end portion, the mounting 466 has a radially extending flange 489. The base 480 of the canister 460 has a similar radially extending flange 488 disposed between the flange 489 of the mounting 466 and a radially extending surface 490 of the end wall 346. A right tubular end portion 492 of the end wall 346 is deformed against the surface of the radially extending flange 489 of the mounting 466 opposite the flange 488. The flange 489 of the mounting 466 and the flange 488 of the base 480 are thus clamped between the surface 490 of the end wall 346 and the deformed end portion 492 of the end wall to retain the canister 460 in the end wall.

The axis D of the canister 460 of the ignition assembly 424 is offset radially from the axis B of the tubular housing 342 of the container 340. The canister 460 is radially offset from the axis B of the container 340 to minimize the possibility that the movable section 482 would be propelled in the chamber 348 to the left and block the opening 184 in the retainer 182 of the initiator assembly 422.

In operation, the initiator assembly 422 is actuated to produce combustion products C2 that heat and pressurize the inflation fluid in the chamber 348, as illustrated in FIG. 6. When the pressure of the inflation fluid in the chamber 348 reaches the predetermined second pressure, the rupture disk 402 ruptures, as illustrated in FIG. 7. The igniter 462 in the ignition assembly 424 is actuated to produce combustion products C4 (FIG. 7), including heat, pressure and hot particles, to ignite the propellant 464.

The propellant 464, upon ignition, produces combustion products C5 (FIG. 8). The combustion products C5 develop sufficient pressure in the chamber 487 in the canister 460 to break the frangible section 484 and separate the movable section 482 from the base section 480. The propellant 464 continues to burn in the movable section 482 and propels the movable section in the chamber 348 to the left. The combustion products C5 further heat and pressurize the inflation fluid in the chamber 348 to help expel the inflation fluid from the chamber and further inflate the air bag.

An air bag inflator 520 (FIG. 9), according to yet another embodiment of the present invention, is similar in structure and function to the inflators 20, 320, illustrated in FIGS. 1–8 and described above. The inflator 520 includes a cylindrical container 540 having a metal tubular housing 542 with a longitudinal central axis C. The container 540 also includes a pair of metal end walls 544, 546 which are fixed to axially opposite ends of the tubular housing 542. The tubular housing 542 and the end walls 544, 546 define a chamber 548 for storing an inflation fluid. The inflation fluid is stored in the chamber 548 at a first pressure.

The tubular housing 542 includes an opening 560. The opening 560 is located in a right end portion of the tubular housing 542. The opening 560 permits the flow of the inflation fluid from the chamber 548 to a location outside of the container 540 to inflate an air bag. A cup-shaped diffuser 580 is fixed to the tubular housing 542 around the opening 560. The diffuser 580 includes a plurality of circular openings 582 which direct the flow of inflation fluid from the opening 560 towards the air bag.

A closure or rupture disk 602 is fixed to an exterior surface of the tubular housing 542. The rupture disk 602 is held between the outer surface of the tubular housing 542 and the diffuser 580. The rupture disk 602 initially blocks the flow of inflation fluid from the chamber 548 through the opening 560. The rupture disk 602 is rupturable to allow the flow of inflation fluid through the opening 560. The rupture disk 602 ruptures in response to the pressure of the inflation fluid in the chamber 548 increasing to a predetermined second pressure. The predetermined second pressure is greater than the first pressure, preferably at least 1.5 times the first pressure.

A pair of actuatable and identically constructed inflation fluid heating assemblies are provided in the form of ignition assemblies 622, 624 are located in the chamber 548 at axially opposite ends of the container 540. The ignition assemblies 622, 624 are identical in structure and function to the ignition assembly 424 illustrated in FIGS. 5–8 and described above. The first ignition assembly 622 is located at the left end of the container 540, as viewed in FIG. 9, and is offset radially from the axis C of the container. The second ignition assembly 624 is located at the right end of the container 540, as viewed in FIG. 9, and is offset radially from the axis C of the container in a direction opposite to the offset of the ignition assembly 622.

Upon actuation, the first ignition assembly 622 produces combustion products including heat and pressure which separate a movable section 682 of a canister 660 from the end wall 544 and propel the movable section into the chamber 548. The combustion products of the first ignition assembly 622 heat and pressurize the inflation fluid in the chamber 548 to the predetermined second pressure to rupture the rupture disk 602. After the rupture disk 602 ruptures, inflation fluid is free to flow from the chamber 548 through the opening 560 in the central housing 542 to the diffuser 580.

Upon actuation, preferably after actuation of the first ignition assembly 622, the second ignition assembly 624 produces combustion products which separate a movable section 682 of the canister 660 from the end wall 546 and propel the movable section into the chamber 548. The combustion products of the second ignition assembly 624 further heat and pressurize the inflation fluid in the chamber 548 to expel the inflation fluid from the container 540 and further inflate the air bag.

According to an optional modification of the inflators 20, 320, 520 of the present invention, the ignitable material 168 and/or the propellant 464 may contain a quantity of a non-metallic nitrogen containing compound. The quantity of the non-metallic nitrogen containing compound is a material capable of undergoing rapid and substantially complete oxidation. The preferred non-metallic nitrogen containing compound is a smokeless powder such as is used in the manufacture of explosives and ammunition. The non-metallic nitrogen containing compound may be a material utilized in a low vulnerability ammunition ("LOVA").

The non-metallic nitrogen containing compound is preferably a material selected from the group consisting of nitroguanadine, triaminoguanadinenitrate, ethylene dinitramine, ethylenediamine dinitrate, 1, 3, 3-trinitroazetidine, cyclotrimethylenetrinitramine, cyclotetramethylenetetranitramine, trinitrotoluene, 2, 4, 6-trinitrophenylmethylnitramine and pentaerythritol tetranitrate and mixtures thereof. Preferably, the non-metallic nitrogen containing compound is cyclotrimethylenetrinitrime (RDX). A second preferred non-metallic nitrogen containing compound is cyclotetramethylenetetranitramine (HMX). The non-metallic nitrogen containing compound is a solid at 20° C.

The modified ignitable material 168 and/or propellant 464 may also include a binder material which is mixed with the non-metallic nitrogen containing compound. The non-metallic nitrogen containing compound is mixed with the binder material to provide a moldable or extrudable plastic mass. Suitable binder materials include materials such as polyether polyester compounds. The proportion of the non-metallic nitrogen containing compound to the binder, by weight, is preferably from about 20:1 to about 5:1.

The non-metallic nitrogen containing compound may also be mixed with a plasticizer in addition to the binder. Any plasticizer typically employed in the manufacture of low vulnerability ammunition may be used. When a plasticizer is used, it is desirable to maintain a weight ratio of the non-metallic nitrogen containing compound to the plasticizer of about 20:1 to about 5:1. The non-metallic nitrogen containing compound mixed with a binder and a plasticizer is preferably extruded to form the modified ignitable material 168 and/or propellant 464. A preferred weight ratio of the non-metallic nitrogen containing compound to the binder and to the plasticizer is about 8:1:1.

The amount of the non-metallic nitrogen containing compound in the modified ignitable material 168 and/or propellant 464 can vary between 3 grams and 15 grams. The preferred amount is 4 to 10 grams. The non-metallic nitrogen containing compound is sufficiently effective in producing combustion products that the non-metallic nitrogen containing compound is the only fuel needed.

The inflation fluid stored in the chamber 48, 348, 548 will comprise a mixture of one or more noble gases and at least one oxidizer gas when the modified ignitable material 168 and/or propellant 464 is used. The noble gases are inert gases. The preferred noble gases are helium and argon, and mixtures thereof. Either argon or helium may be used alone. Also, a mixture of argon and helium in any proportions may be employed. A preferred mixture is argon and helium in a volume ratio of 95% to 5%.

The oxidizer gas is any gas capable of oxidizing the non-metallic nitrogen containing compound to produce combustion products. Preferably, the oxidizer gas is oxygen. The oxygen is preferably the only gas other than the noble gas present in the supply of stored gases. When utilizing argon as the noble gas, the volume ratio of oxygen to argon is typically about 1:3 to about 1:8 respectively. The inflation fluid is stored in the chamber 48, 348, 548 at a pressure of between 3,000 psi and 5,000 psi, preferably about 4,000 psi.

An advantage to using the quantity of non-metallic nitrogen containing compound in the modified ignitable material 168 and/or propellant 464 to produce heat upon ignition is that metallic by-products are not produced. The combustion products produced by the ignition of the non-metallic nitrogen containing compound are relatively smokeless. Also, the noble gases have relatively low specific heats. Thus for a given quantity of the non-metallic nitrogen containing compound, a relatively high pressure change may be obtained when using a noble gas. The noble gases are also non-reactive when heated by the ignited non-metallic nitrogen containing compound.

FIGS. 10-13 illustrate an inflator 700 constructed in accordance with a fourth embodiment of the present invention. The inflator 700 includes a container 702 which defines first and second chambers 704 and 706 for containing inflation fluid under pressure. The inflator 700 also includes first and second independently actuatable heating assemblies 708 and 710 for heating and pressurizing the inflation fluid in the first and second chambers 704 and 706, respectively.

The container 702 (FIG. 10) includes a main body portion 720 and two end caps 722 and 724. The main body portion 720 of the container 702 is impact extruded as one piece from a 1510 or 1512 low carbon steel. The main body portion 720 as thus formed includes a first chamber wall 726, a second chamber wall 728, and a diffuser 730.

The first chamber wall 726 has a cylindrical configuration centered on an axis 740 of the inflator 700. The first chamber wall 726 extends axially from the diffuser 730. The second chamber wall 728 is a mirror image, about a reference plane 746, of the first chamber wall 726. The reference plane 746 extends radially through the axial center of the diffuser 730. The second chamber wall 728 has a cylindrical configuration centered on the axis 740. The second chamber wall 728 extends axially from the diffuser 730 in a direction opposite the first chamber wall 726.

The diffuser 730 is in the form of a radially extending wall portion of the container 702. The diffuser 730 has a cylindrical outer side surface 752 (FIG. 11) which merges with the outer side surfaces of the first and second chamber walls 726 and 728. The diffuser 730 also has parallel, radially extending, first and second side surfaces 754 and 756. The diffuser 730 separates the first chamber 704 from the second chamber 706.

A first outlet opening 760 in the first side surface 754 of the diffuser 730 is in fluid communication with the first chamber 704. The first outlet opening 760 has a cylindrical configuration and is disposed at a location off the axis 740. A group of three first outlet passages 762 in the diffuser 730 extend between the first outlet opening 760 and the outer side surface 752 of the diffuser. Each one of the first outlet passages 762 has a cylindrical configuration centered on the reference plane 746. Each one of the first outlet passages 762 has a first diameter. The first outlet passages 762, as a group, have a total flow area which is equal to the sum of the individual flow areas of the three first outlet passages.

The diffuser 730 includes a second outlet opening 770 in the second side surface 756 of the diffuser. The second outlet opening 770 is in fluid communication with the second chamber 706. The second outlet opening 770 has a cylindrical configuration and is disposed off the axis 740 at a location diametrically opposite the first outlet opening 760.

A group of three second outlet passages 772 in the diffuser 730 extend between the second outlet opening 770 and the outer side surface 752 of the diffuser. Each one of the second outlet passages 772 has a cylindrical configuration centered on the reference plane 746. The second outlet passages 772, as a group, have a total flow area which is equal to the sum of the individual flow areas of the three second outlet passages. Each one of the second outlet passages 772 has a second diameter greater than the first diameter. Therefore, the second outlet passages 772, as a group, have a total flow area which is greater than the total flow area of the first outlet passages 762.

A fill passage 778 is formed in the diffuser 730. The fill passage 778 has a cylindrical configuration and extends between the first and second side surfaces 754 and 756 of the diffuser 730. The fill passage 778 establishes fluid communication between the first chamber 704 and the second chamber 706 of the inflator 700. The inflator 700 does not include any other means of fluid communication between the first chamber 704 and the second chamber 706.

The fill passage 778 has a relatively small flow area. The flow area of the fill passage 778 is selected to be large enough to enable sufficiently rapid filling of the second chamber 706 from the first chamber 704, during manufacture of the inflator 700, but small enough to prevent any significant flow of inflation fluid between the chambers during actuation of the inflator. In one embodiment, the fill passage 778 has a diameter in the range of from about 1 mm to about 2 mm, while the inflator 700 has an outside diameter of about 45 to 51 mm.

A first closure in the form of a first rupture disk 780 is fixed to the first side surface 754 of the diffuser 730. The first rupture disk 780 extends across the first outlet opening 760 and blocks the flow of inflation fluid from the first chamber 704 through the first outlet opening. The first rupture disk 780 is rupturable in a manner described below to permit inflation fluid to flow from the first chamber 704 through the first outlet opening 760.

A second closure in the form of a second rupture disk 782 is fixed to the second side surface 756 of the diffuser 730. The second rupture disk 782 extends across the second outlet opening 770 and blocks the flow of inflation fluid from the second chamber 706 through the second outlet opening. The second rupture disk 782 is rupturable in a manner described below to permit inflation fluid to flow from the second chamber 706 through the second outlet opening 770.

The first heating assembly 708 is supported on the first end cap 722 of the container 702. The first end cap 722 has an annular, outer peripheral portion 790 welded to the first chamber wall 726 by friction welding or by laser beam welding. The first end cap 722 also has a tubular inner portion 792 centered on the axis 740. The inner portion 792 of the end cap 722 defines a combustion chamber 794. The combustion chamber 794 is disposed inside the first chamber 704.

The first end cap 722 has a tubular outer end portion 796. The first heating assembly 708 includes an actuatable igniter 800 disposed in the outer end portion 796 of the end cap 722. The igniter 800 is located on the axis 740. The igniter 800 is connected by lead wires 802 to vehicle electric circuitry (not shown).

The inflator 700 includes a retainer 804 in abutting engagement with the igniter 800. The outer end portion 796 of the end cap 722 is deformed over the retainer 804 and holds the retainer in position on the end cap. The retainer 804 secures the igniter 800 in position in the inflator 700. An O-ring 806 seals between the igniter 800 and the end cap 722.

The first heating assembly 708 includes a first burst foil 808. The first burst foil 808 is a thin metal member supported by a perforate, radially extending portion 810 of the end cap 722 presented toward the diffuser 730. The first burst foil 808 isolates the igniter 800 from the pressurized inflation fluid in the first chamber 704. The first burst foil 808 is designed to rupture as described below, upon actuation of the igniter 800, to allow the combustion products of the igniter to flow into the combustion chamber 794.

The first heating assembly 708 also includes an ignitable material or propellant 812, such as potassium perchlorate, located in the combustion chamber 794. The ignitable material 812 is a material which, upon ignition, produces combustion products C2 (FIG. 12) including heat. In the embodiment of the invention illustrated in FIGS. 10–13, the ignitable material 812 is in the form of a plurality of pellets.

A metal strainer 814 holds the ignitable material 812 in position in the combustion chamber 794. The strainer 814 has a central opening 816 located on the axis 740. The inner portion 792 of the end cap 722 is deformed over the outer periphery of the strainer 814 to hold the strainer in position.

A mesh screen 818 is disposed between the ignitable material 812 and the strainer 814. The screen 818 prevents movement of the pellets of ignitable material 812 through the strainer 814 upon actuation of the inflator 700. An elastomeric cushion (not shown) may be provided between the strainer 814 and the ignitable material 812.

A fill hole 820 is formed in the first end cap 722 of the container 720. The fill hole 820 extends between the exterior of the inflator 700 and the first chamber 704. The fill hole 820 enables simultaneous filling of the first and second chambers 704 and 706 of the inflator 700 with inflation fluid under pressure during manufacture of the inflator. Specifically, a portion of the inflation fluid put into the first chamber 704 through the fill hole 820 flows through the fill passage 778 into the second chamber 706, to fill the second chamber. The first and second chambers 704 and 706 are pressurized to a predetermined first pressure during manufacture of the inflator 700. A fill ball 822 closes the fill hole 820 after the inflator 700 is filled.

The second heating assembly 710 is located at the right end of the inflator 700, as viewed in FIG. 10, in association with the second chamber 706 of the inflator. The construction and mode of operation of the second heating assembly 710 are identical to the construction and mode of operation of the first heating assembly 708.

The second heating assembly 710 is supported on the second end cap 724 of the container 702. The second end cap 724 has a tubular inner portion 828 centered on the axis 740. The inner portion 828 of the end cap 724 defines a combustion chamber 830 disposed in the second chamber 706. The second end cap 724 has a tubular outer end portion 832.

The second heating assembly 710 includes an actuatable second igniter 834 disposed in the outer end portion 832 of the second end cap 724. The second igniter 834 is connected by lead wires 836 to vehicle electric circuitry (not shown). A second retainer 838 secures the second igniter 834 in position in the inflator 700. A second burst foil 840 isolates the second igniter 834 from the pressurized inflation fluid in the second chamber 706.

The second heating assembly 710 includes a second ignitable material or propellant 842 located in the combustion chamber 830. A metal strainer 844 holds the second ignitable material 842 in position in the second combustion chamber 830. A mesh screen 846 is disposed between the second propellant 842 and the strainer 844.

The inflator 730 is actuated in a manner similar to the manner of actuation of the inflators illustrated in FIGS. 1–9. The first igniter 800 is actuated by an electric current over the lead wires 802. Upon actuation, the first igniter 800 produces combustion products C1 (FIG. 12) which rupture the first burst foil 808. The combustion products C1 flow through the perforate portion 810 of the first end cap 722 and contact the ignitable material 812 in the first combustion chamber 794.

Figure 12:
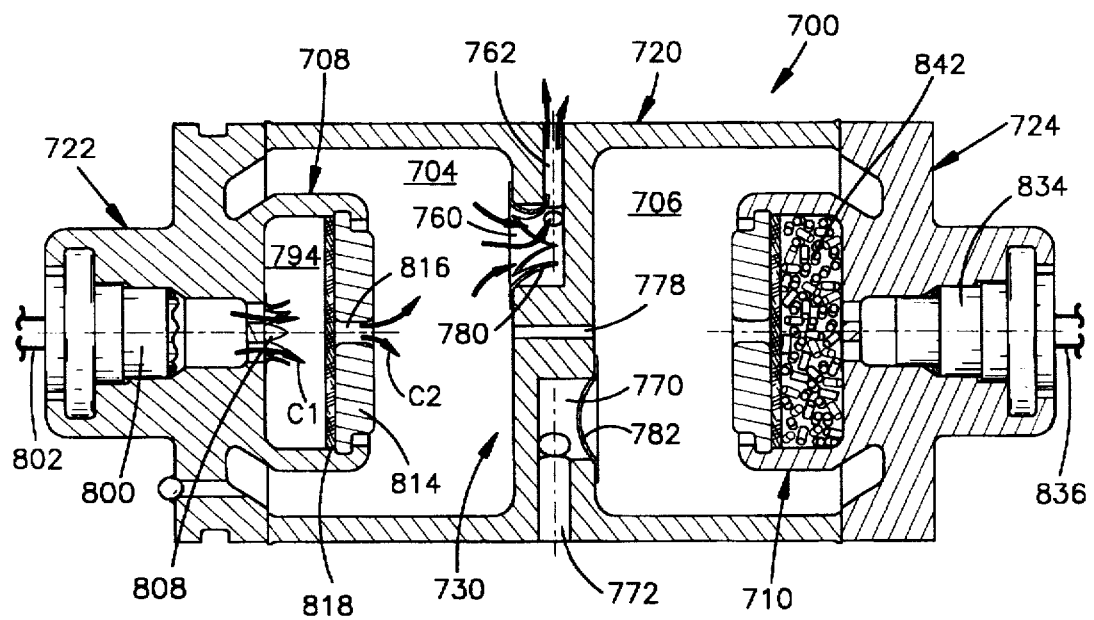
FIG. 12 is a view similar to FIG. 10 showing the inflator in a first actuated condition.

The ignitable material 812 ignites and produces combustion products C2 in the first combustion chamber 794. The combustion products C2 flow through the mesh screen 818 and through the opening 816 in the strainer 814. The combustion products C2 contact the inflation fluid in the first chamber 704. The combustion products C2 heat the inflation fluid in the first chamber 704. Heating the inflation fluid causes the pressure in the first chamber 704 to increase to a predetermined second pressure and rupture the first rupture disk 780, as illustrated in FIG. 12.

After the first rupture disk 780 is ruptured, the inflation fluid flows out of the first chamber 704 through the first outlet opening 760 in the diffuser 730. The inflation fluid then flows through the three first outlet passages 762 in the diffuser 730 and into the air bag (not shown).

The second heating assembly 710 is actuated by an electric current over the lead wires 836. The second igniter 834 produces combustion products C3 which rupture the second burst foil 840. The combustion products C3 flow through the perforate portion of the second end cap 724 and contact the second ignitable material 842 in the second combustion chamber 830. The second ignitable material 842 ignites and produces combustion products C4 in the second combustion chamber 830. The combustion products C4 flow through the screen 846 and through the central opening in the strainer 844.

Figure 13:
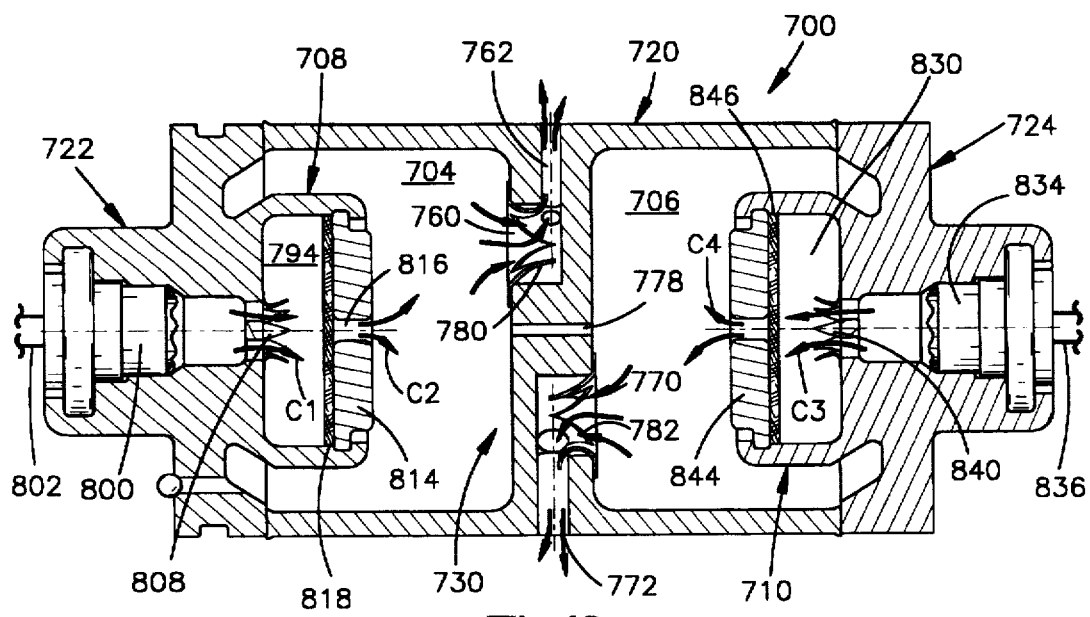
FIG. 13 is a view similar to FIG. 10 showing the inflator in a second actuated condition.

The combustion products C4 contact the inflation fluid in the second chamber 706. The combustion products C4 heat the inflation fluid in the second chamber 706. Heating the inflation fluid causes the pressure in the second chamber 706 to increase to a predetermined third pressure and rupture the second rupture disk 782, as illustrated in FIG. 13. After the second rupture disk 782 is ruptured, the inflation fluid flows out of the second chamber 706 through the second outlet opening 770 in the diffuser 730. The inflation fluid then flows through the three second outlet passages 772 in the diffuser 730 and into the air bag.

In the preferred embodiment, the second heating assembly 710 is actuated a predetermined period of time after the first heating assembly 708. As a result, the air bag is inflated slowly at first, then much more forcefully after a predetermined period of time. Specifically, because the total flow area of the first outlet passages 762 is relatively small, the rate of flow of inflation fluid into the air bag, from the first chamber 704, is relatively low. Because the total flow area of the second outlet passages 772 is relatively great compared to the total flow area of the first outlet passages 762, the rate of flow of inflation fluid into the air bag, from the second chamber 706, is relatively high compared to the rate of flow of inflation fluid from the first chamber 704. This difference in the flow rates causes the air bag to inflate more slowly at first, then more rapidly. The time delay between actuation of the first igniter 800 and the second igniter 834 can be determined in the same manner as described above with reference to the controller 282.

FIG. 14 illustrates an inflator 700a constructed in accordance with a fifth embodiment of the present invention. The inflator 700a is similar in construction to the inflator 700 (FIGS. 10–13), with the exception that the inflator 700a includes two heating assemblies 112a and 124a instead of the heating assemblies 708 and 710. The heating assemblies 122a and 124a are identical in construction and mode of operation to the heating assemblies 122 and 124 (FIG. 1) described above with reference to the inflator 20. In the inflator 700a, the heating assembly 122a is associated with a first inflation fluid chamber 704a. The heating assembly 124a is associated with a second inflation fluid chamber 706a. A diffuser 730a separates the two inflation fluid chambers 704a and 706a.

The inflator 700a operates in the same manner as the the inflator 700 (FIGS. 10–13). The first heating assembly 122a (FIG. 14) is actuated to cause heating and pressurization of the inflation fluid in the first chamber 704a. The first burst disc 780a ruptures. Inflation fluid from the first chamber 704a flows through the first outlet opening 760a and the first outlet passages 762a into the air bag.

After a predetermined period of time, the second heating assembly 124a is actuated to cause heating and pressurization of the inflation fluid in the second chamber 706a. The second burst disc 782a ruptures. Inflation fluid from the second chamber 706a flows through the second outlet opening 770a and the second outlet passages 772a into the air bag.

FIG. 15 illustrates an inflator 20a constructed in accordance with a sixth embodiment of the present invention. The inflator 20a is similar in construction to the inflator 20 (FIGS. 1–4), with the exception that the inflator 20a (FIG. 15) includes two heating assemblies 708a and 710a instead of the heating assemblies 122 and 124. The heating assemblies 708a and 710a are similar in construction and mode of operation to the heating assemblies 708 and 710 (FIG. 10) described above with reference to the inflator 700.

In the heating assemblies 708a and 710a, however, the ignitable material and the strainer are somewhat different than in the heating assemblies 708 and 710 (FIG. 10). Specifically, in the heating assembly 708a (FIG. 15), the ignitable material 812a is a single extruded grain rather than a plurality of pellets. Also, in the heating assembly 708a, the strainer 814a (FIGS. 15 and 16) has a plurality of openings 816a rather than a single opening. Similarly, in the heating assembly 710a, the ignitable material 842a is a single extruded grain rather than a plurality of pellets, and the strainer 844a has a plurality of openings 846a rather than a single opening.

The grain of ignitable material 812a has a plurality of pin holes (not shown). The openings 816a in the strainer 814a are lined up with the pin holes in the grain 812a. Similarly, the openings 846a in the strainer 844a are lined up with the pin holes (not shown) in the grain 842a. The strainers 812a and 814a may, alternatively, be used with pellets or tablets of ignitable material. If a strainer with a plurality of openings is used together with a plurality of pellets or tablets of ignitable material, then a screen mesh, such as the screen mesh 818 (FIG. 10) must be used to prevent the pellets from extruding through the openings in the strainer.

The inflator 20a operates in the same manner as the inflator 20 (FIGS. 1–4). The first heating assembly 708a (FIG. 15) is actuated to cause heating and pressurization of the inflation fluid in the chamber 48a. The burst disc 102a ruptures. Inflation fluid from the chamber 48a flows through the diffuser 80a into the air bag. The second heating assembly 710a is actuated to further heat and further pressurize the inflation fluid in the chamber 48a.

From the above description of the invention, those skilled in the art will perceive improvements, changes and modifications. For example, in any of the described inflators, the two heating assemblies could be actuated simultaneously, or in a different order than as described. Such improvements, changes and modifications within the skill of the art are intended to be covered by the appended claims.

Having described the invention, we claim the following:

1. An apparatus for inflating an air bag, said apparatus comprising:
   a cylindrical container defining a chamber for storing inflation fluid at a first pressure, said container comprising a tubular housing having a longitudinal central axis and a pair of end walls fixed to axially opposite ends of said tubular housing, said tubular housing having an opening at a location intermediate said end walls;
   a rupturable closure extending across the opening in said tubular housing, said closure rupturing in response to the pressure of the inflation fluid in the chamber increasing from the first pressure to a predetermined second pressure; and
   a pair of inflation fluid heating assemblies, each of the inflation fluid heating assemblies located at a different one of said end walls of said container and at least partially located in the chamber, each of said inflation fluid heating assemblies comprising:
      an actuatable igniter supported by one of said end walls; and
      an ignitable material surrounding an end of said igniter;
      said igniter in one inflation fluid heating assembly, when actuated, igniting said ignitable material in said one inflation fluid heating assembly to produce combustion products which are released into the chamber to heat the inflation fluid and increase the pressure of the inflation fluid in the chamber to the predetermined second pressure for rupturing said closure;
      said igniter in the other inflation fluid heating assembly, upon actuation, igniting said ignitable material in said other inflation fluid heating assembly to produce combustion products which are released into the chamber to further heat and further increase the pressure of the inflation fluid in the chamber.

2. The apparatus of claim 1 wherein each of said inflation fluid heating assemblies is located coaxially along the axis of said tubular housing and further includes a retainer for holding its ignitable material in place, said retainer having an opening through which combustion products flow into the inflation fluid storage chamber.

3. The apparatus of claim 2 wherein said retainers are attached to said end walls by axially extending end portions of said end walls being deformed over peripheral edge portions of said retainers and wherein the openings in said retainers are located along the axis of said tubular housing.

4. The apparatus of claim 1 wherein each of said end walls includes a tubular portion and an annular mounting, and wherein each of said inflation fluid heating assemblies further includes a cup having a base portion which is rupturable in response to actuation of one of said igniters, a tubular side wall portion adapted to extend axially along the tubular portion of one of said end walls and a flange portion adapted to be fixed to the annular mounting of said one end wall.

5. The apparatus of claim 4 wherein in each one of said heating assemblies said cup cooperates with one of said end walls to define a combustion chamber and said ignitable material and an end of said igniter are located in said combustion chamber.

6. The apparatus of claim 1 wherein said igniter in said other inflation fluid heating assembly is actuated after actuation of said igniter in said one inflation fluid heating assembly.

7. The apparatus of claim 1 wherein the opening in said housing is located substantially at a middle of the axial extent of said housing.

8. An apparatus for inflating an air bag, said apparatus comprising:
   a cylindrical container defining a chamber for storing inflation fluid at a first pressure, said container comprising a tubular housing having a longitudinal central axis and a pair of end walls fixed to axially opposite ends of said tubular housing, said tubular housing having an opening at a location intermediate said end walls;
   a rupturable closure extending across the opening in said housing, said closure rupturing in response to pressure of the inflation fluid in the chamber increasing from the first pressure to a predetermined second pressure; and
   a pair of inflation fluid heating assemblies, each of said inflation fluid heating assemblies located at a different one of axially opposite end portions of said container and at least partially located in the chamber, each of said inflation fluid heating assemblies comprising:
      a rupturable cup fixed to a corresponding one of said end walls and cooperating with said one end wall to define a combustion chamber;
      an actuatable igniter supported by said one end wall and having a portion located in the combustion chamber; and
      an ignitable material in the combustion chamber and surrounding and end of said igniter;
   said igniter in one inflation fluid heating assembly, when actuated, igniting said ignitable material in said one inflation fluid heating assembly to produce combustion products which increase the pressure in its combustion chamber and rupture a portion of its rupturable cup to release the combustion products into the inflation fluid storage chamber to heat the inflation fluid and increase the pressure of the inflation fluid in the inflation fluid storage chamber to the predetermined second pressure for rupturing said closure;
   said igniter in the other inflation fluid heating assembly, upon being actuated after actuation of said igniter in said one inflation fluid heating assembly, igniting said ignitable material in said other inflation fluid heating assembly to produce combustion products which increase the pressure in its combustion chamber and rupture a portion of its rupturable cup to release the combustion products into the inflation fluid storage chamber to further heat the inflation fluid and further increase the pressure of the inflation fluid in the inflation fluid storage chamber.

9. An apparatus for inflating an air bag, said apparatus comprising:
   a cylindrical container defining a chamber for storing inflation fluid at a first pressure, said container comprising a tubular housing having a longitudinal central axis and a pair of end walls fixed to axially opposite ends of said tubular housing, said tubular housing having an opening at a location intermediate said end walls;

a rupturable closure extending across the opening in said housing, said closure rupturing in response to pressure of the inflation fluid in the chamber increasing from the first pressure to a predetermined second pressure;

an initiator assembly at a first axial end of said container and partially located in the chamber, said initiator assembly comprising:

a rupturable cup fixed to one of said end walls and cooperating with said one end wall to define a combustion chamber;

an actuatable igniter supported by said one end wall and having an end portion located in the combustion chamber; and an ignitable material in the combustion chamber;

an ignition assembly at a second axial end of said container, said ignition assembly comprising:

a canister having a base section fixed to another of said end walls and a movable section attached to said base section, said movable section being separable from said base section;

a propellant in said canister; and an actuatable igniter supported by said another of said walls and having an end portion located in said canister;

said igniter in said initiator assembly, upon actuation, igniting said ignitable material to produce combustion products which rupture a portion of said cup to release the combustion products into the inflation fluid storage chamber and heat the inflation fluid to the predetermined second pressure for rupturing said closure; and said igniter in said ignition assembly, upon actuation, igniting said propellant to produce combustion products which separate said movable section from said base section and propel said movable section in the inflation fluid storage chamber to further heat and pressurize the inflation fluid in the inflation fluid storage chamber.

10. The apparatus of claim 9 wherein said initiator assembly is located coaxially along the axis of said housing and further includes a retainer for holding said ignitable material in the combustion chamber, said retainer having an opening through which the combustion products flow from the combustion chamber into the inflation fluid storage chamber.

11. The apparatus of claim 9 wherein said canister of said ignition assembly is offset radially from the axis of said housing.

12. The apparatus of claim 9 wherein one of said initiator assembly and said ignition assembly is actuated after actuation of the other of said ignition assembly and said initiator assembly.

13. An apparatus for inflating an air bag, said apparatus comprising:

a cylindrical container defining a chamber for storing inflation fluid at a first pressure, said container comprising a tubular housing having a longitudinal central axis and a pair of end walls fixed to axially opposite ends of said tubular housing, said tubular housing having an opening at a location intermediate said end walls;

a rupturable closure extending across the opening in said housing, said closure rupturing in response to pressure in the chamber increasing from the first pressure to a predetermined second pressure; and a pair of ignition assemblies located at axially opposite ends of said container and in the chamber, each of said ignition assemblies comprising:

a canister having a base section fixed to one of said end walls and a movable section attached to said base section, said movable section being separable from said base section;

a propellant located in said movable section of said canister; and an actuatable igniter supported by said one of said end walls and having an end portion located in said canister;

said igniter in one ignition assembly, upon actuation, igniting said propellant to produce combustion products which separate said movable section from said base section and propel said movable section in the chamber and release the combustion products into the chamber to heat the inflation fluid to the second pressure for rupturing said closure;

said igniter in the other ignition assembly, upon actuation, igniting said propellant to produce combustion products which separate said movable section from said base section of said other ignition assembly and propel said movable section in the chamber to further heat and further pressurize the inflation fluid in the chamber.

14. The apparatus of claim 13 wherein at least one of said canisters is fixed to its corresponding end wall at a location radially offset from the axis of said housing.

15. The apparatus of claim 14 wherein said canisters are radially offset in opposite directions from the axis of said housing.

16. The apparatus of claim 13 wherein said movable section of each ignition assembly is connected to said corresponding base section at a frangible section which breaks in response to a predetermined pressure increase in the associated canister.

17. The apparatus of claim 13 wherein said other ignition assembly is actuated after actuation of said one ignition assembly.

18. An apparatus for inflating an air bag, said apparatus comprising:

a cylindrical container defining a chamber for storing inflation fluid at a first pressure, said container comprising a tubular housing having a longitudinal central axis and a pair of end walls fixed to axially opposite ends of said tubular housing, said tubular housing having an opening at a location intermediate said end walls;

a rupturable closure extending across the opening in said housing, said closure rupturing in response to pressure of the inflation fluid in the chamber increasing from the first pressure to a predetermined second pressure;

an initiator assembly at one axial end of said container and at least partially located in the chamber, said initiator assembly comprising:

a rupturable cup fixed to one of said end walls and cooperating with said one end wall to define a combustion chamber;

an actuatable igniter supported by said one end wall and having an end portion located in the combustion chamber; and an ignitable material located in the combustion chamber;

an ignition assembly at another axial end of said container, said ignition assembly comprising:

a canister having a base section fixed to another of said end walls and a movable section attached to said base section, said movable section being separable from said base section;

a propellant located in said canister; and an actuatable igniter supported in said another of said end walls and having an end portion located in said canister;

said igniter in one of said initiator assembly and said ignition assembly, upon actuation, producing combustion products to effect the heating and pressurizing of the inflation fluid in the chamber; and said igniter in the other of said ignition assembly and said initiator assembly, upon actuation, effecting the heating and pressurizing of the inflation fluid in the chamber.

19. The apparatus of claim 18 wherein a first one of said igniters is actuated before actuation of a second one of said igniters.

20. The apparatus of claim 19 wherein actuation of said first one of said igniters increases the pressure of the inflation fluid in the chamber to the predetermined second pressure for rupturing said closure and actuation of said second one of said igniters effects the further heating and pressurizing of the inflation fluid in the chamber.

21. An apparatus for inflating an air bag, said apparatus comprising:

a container defining a chamber for storing inflation fluid at a first pressure, said container having an opening through which the inflation fluid can flow;

a rupturable closure extending across the opening of said container, said closure rupturing in response to pressure in the chamber increasing from the first pressure to a predetermined second pressure; and a pair of inflation fluid heating assemblies each of said inflation fluid heating assemblies comprising:
an actuatable igniter; and
an igniter material adjacent said igniter;

said igniter in one inflation fluid heating assembly, upon actuation, igniting said ignitable material in the one inflation fluid heating assembly to produce combustion products which heat and pressurize the inflation fluid in the chamber to the predetermined second pressure to rupture said closure;

said igniter in the other inflation fluid heating assembly, upon actuation, igniting said ignitable material in said other inflation fluid heating assembly to produce combustion products which further heat and pressurize the inflation fluid in the chamber;

said container comprising a tubular housing having a longitudinal central axis and a pair of end walls fixed to axially opposite ends of said tubular housing, the opening in said container being located in said tubular housing;

said inflation fluid heating assemblies located coaxially along the axis of said tubular housing.

22. The apparatus of claim 21 wherein said igniter in said other inflation fluid heating assembly is actuated after said igniter in said one inflation fluid heating assembly is actuated.

23. The apparatus of claim 21 wherein each one of said inflation fluid heating assemblies further includes a rupturable cup fixed to one of said end walls and cooperating with the one of said end walls to define a combustion chamber for the combustion products to act on and rupture a portion of said cup.

24. The apparatus of claim 23 wherein each one of said inflation fluid heating assemblies further includes a retainer for holding the ignitable material in the combustion chamber, said retainer having an openings through which combustion products flow from the combustion chamber into the chamber storing the inflation fluid.

25. The apparatus of claim 24 wherein said retainers are held on said end walls by axial end portions of said end walls deformed over peripheral edge portions of said retainers and wherein the openings in said retainers are located along the axis of said housing.

26. The apparatus of claim 23 wherein in each heating assembly said ignitable material is tubular and located in the combustion chamber and surrounds an end portion of the igniter.

\* \* \* \* \*